(12) United States Patent
Piesker

(10) Patent No.: US 12,263,948 B2
(45) Date of Patent: Apr. 1, 2025

(54) PRIMARY STRUCTURAL ASSEMBLY FOR AN AIRCRAFT OUTSIDE-SKIN HEAT EXCHANGER, AIRCRAFT HAVING A PRIMARY STRUCTURAL ASSEMBLY, AND METHOD FOR ATTACHING AN AIRCRAFT OUTSIDE-SKIN HEAT EXCHANGER

(71) Applicant: Airbus Operations GmbH, Hamburg (DE)

(72) Inventor: Markus Piesker, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 46 days.

(21) Appl. No.: 17/611,381

(22) PCT Filed: Aug. 5, 2020

(86) PCT No.: PCT/EP2020/071953
§ 371 (c)(1),
(2) Date: Nov. 15, 2021

(87) PCT Pub. No.: WO2021/032476
PCT Pub. Date: Feb. 25, 2021

(65) Prior Publication Data
US 2022/0204167 A1    Jun. 30, 2022

(30) Foreign Application Priority Data
Aug. 21, 2019    (DE) .......................... 102019122426.8

(51) Int. Cl.
*B64D 13/00*    (2006.01)
*B64C 1/00*    (2006.01)

(52) U.S. Cl.
CPC .............. *B64D 13/006* (2013.01); *B64C 1/00* (2013.01)

(58) Field of Classification Search
CPC ........ B64D 13/006; B64D 13/08; B64D 6/14; B64D 6/29; B64C 1/00; B64C 1/38; B64C 1/12
See application file for complete search history.

(56) References Cited

U.S. PATENT DOCUMENTS

| | | |
|---|---|---|
| 10,011,362 B2 | 7/2018 | Piesker |
| 2011/0186263 A1* | 8/2011 | Piesker ..................... F28F 1/00 165/47 |

(Continued)

FOREIGN PATENT DOCUMENTS

| | | |
|---|---|---|
| DE | 102009048459 A1 | 2/2011 |
| DE | 102010051517 A1 | 5/2012 |

(Continued)

OTHER PUBLICATIONS

German Search Report; priority document.
International Search Report; priority document.

*Primary Examiner* — Richard Green
*Assistant Examiner* — Nevena Aleksic
(74) *Attorney, Agent, or Firm* — Greer, Burns & Crain, Ltd.

(57) ABSTRACT

A primary structural assembly for an aircraft outside-skin heat exchanger, the assembly comprising an outer-skin portion which defines an outer shape of the aircraft and forms a portion of a hull of the aircraft, wherein the outer-skin portion comprises at least one recess, a thermal-transfer fluid connection which is designed to convey a thermal-transfer fluid into the recess, a component which closes the recess, and at least one retaining element which is arranged in or on the recess and is configured to hold the component closing the recess, in the recess. Further, an aircraft including such a primary structural assembly and a method for attaching the aircraft outside-skin heat exchanger are disclosed.

16 Claims, 8 Drawing Sheets

(56) References Cited

U.S. PATENT DOCUMENTS

| | | | |
|---|---|---|---|
| 2012/0118528 A1 | 5/2012 | Al-Ali | |
| 2013/0331019 A1* | 12/2013 | Piesker | F28F 1/02 |
| | | | 454/76 |
| 2014/0345305 A1 | 11/2014 | Piesker et al. | |
| 2015/0027676 A1 | 1/2015 | Eilken et al. | |
| 2015/0246719 A1* | 9/2015 | Pelissier | B64C 1/068 |
| | | | 244/120 |
| 2015/0354907 A1* | 12/2015 | Herzberg | B23P 15/26 |
| | | | 165/135 |
| 2016/0207606 A1* | 7/2016 | Hara | B64C 7/00 |

FOREIGN PATENT DOCUMENTS

| | | |
|---|---|---|
| DE | 102013008620 A1 | 11/2014 |
| EP | 2738104 A2 | 6/2014 |
| FR | 2995589 A1 | 3/2014 |
| WO | 2011003723 A2 | 1/2011 |
| WO | 2013149936 A1 | 10/2013 |

\* cited by examiner

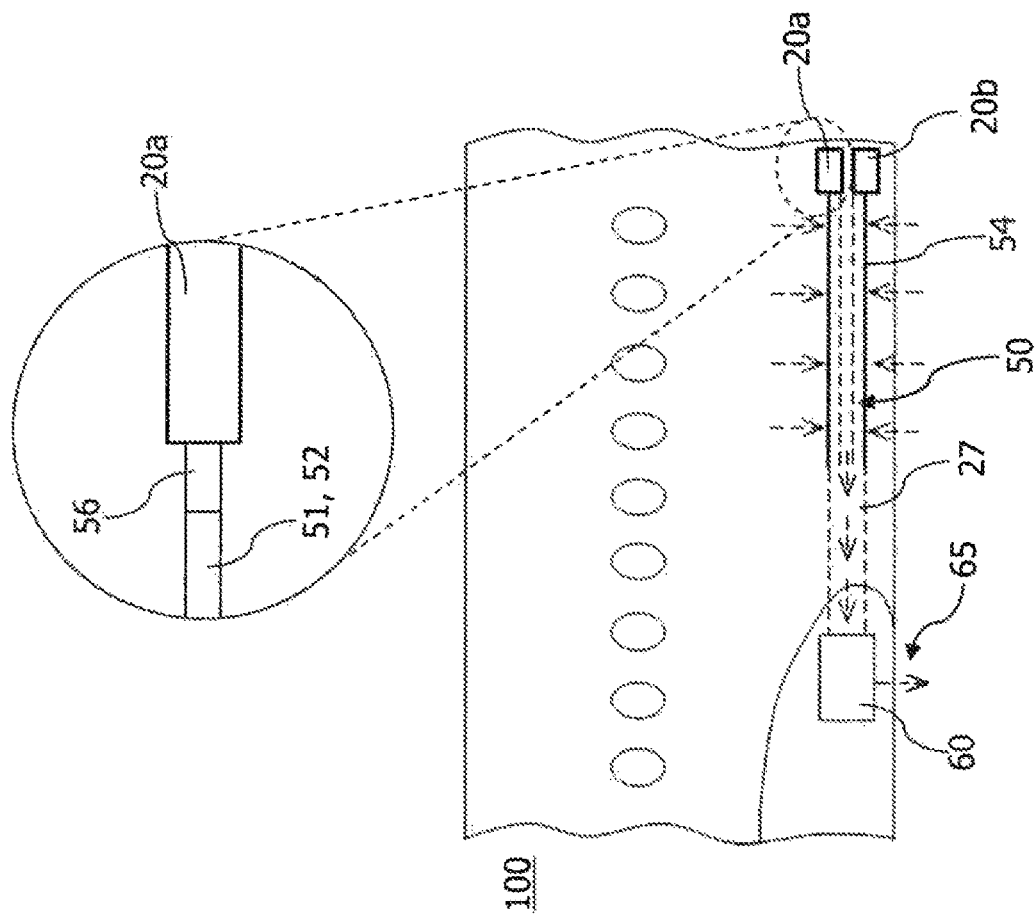
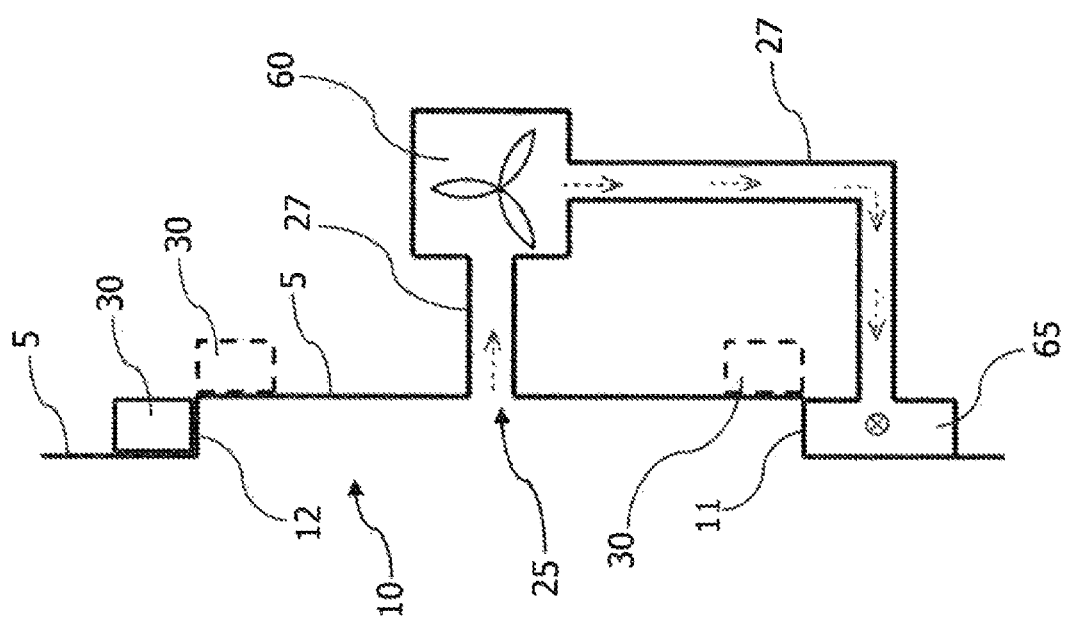
Figure 3
Figure 2

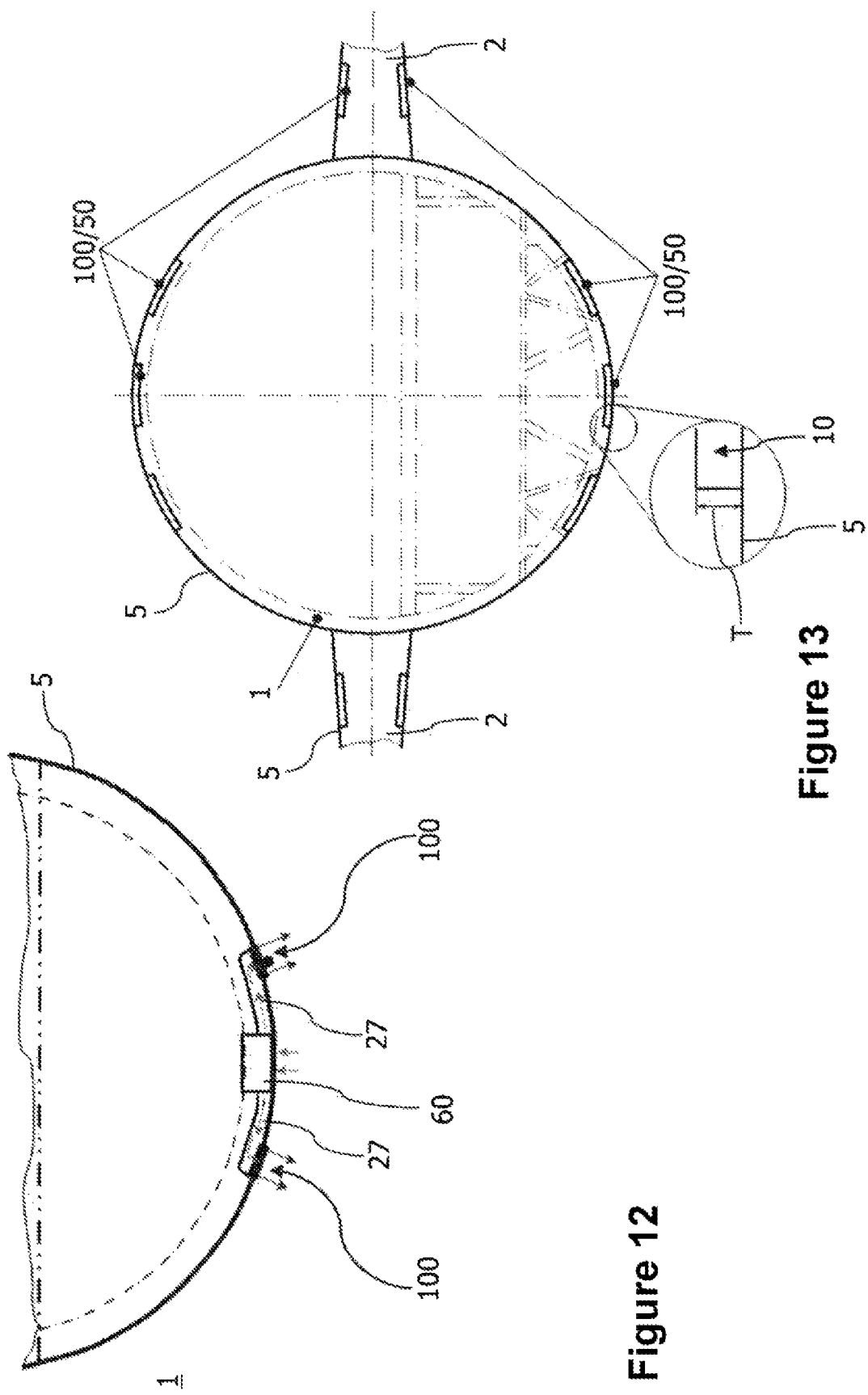

PRIMARY STRUCTURAL ASSEMBLY FOR AN AIRCRAFT OUTSIDE-SKIN HEAT EXCHANGER, AIRCRAFT HAVING A PRIMARY STRUCTURAL ASSEMBLY, AND METHOD FOR ATTACHING AN AIRCRAFT OUTSIDE-SKIN HEAT EXCHANGER

CROSS-REFERENCES TO RELATED APPLICATIONS

This application claims the benefit of the International Application No. PCT/EP2020/071953, filed on Aug. 5, 2020, and of the German patent application No. 102019122426.8 filed on Aug. 21, 2019, the entire disclosures of which are incorporated herein by way of reference.

FIELD OF THE INVENTION

The invention relates to a primary structural assembly for an aircraft outside-skin heat exchanger, to an aircraft having such a primary structural assembly, and to a method for attaching an aircraft outside-skin heat exchanger. In particular, the invention relates to a primary structural assembly having an outside skin portion, which has a recess, and a heat transfer fluid connection, and a structural element closing the recess. The invention relates further to an aircraft having such a primary structural assembly and to a method for attaching an aircraft outside-skin heat exchanger in such a recess of an outside skin portion.

BACKGROUND OF THE INVENTION

Aircraft are conventionally equipped with cooling systems which use the ambient air of the aircraft as a heat sink. In order to provide the cooling systems with sufficient cooling energy, a cooling air stream of ambient air is passed over a heat exchanger of the cooling system. The cooling air stream can be effected, for example, in a ram air channel, wherein the heat exchanger is arranged between a ram air inlet opening and a ram air outlet opening of the ram air channel. In ground operation of the aircraft, a conveying device can generate the cooling air stream in the ram air channel. However, owing to the openings in the outer shell of the aircraft, turbulence is generated, which increases the fuel consumption of the aircraft.

Further known are aircraft outside-skin heat exchangers which have a surface which forms part of the outside skin of the aircraft. It is thus possible to dispense with a ram air channel, and turbulence at the outside skin of the aircraft can be reduced. However, aircraft outside-skin heat exchangers represent an interference with the outer shell of the aircraft, whereby the aircraft structure must be adapted to the aircraft outside-skin heat exchangers.

SUMMARY OF THE INVENTION

Accordingly, an object of the invention is to provide an improved primary structural assembly for an aircraft outside-skin heat exchanger, an aircraft having such a primary structural assembly, and a method for more easily attaching an aircraft outside-skin heat exchanger.

According to a first aspect for better understanding of the present disclosure, a primary structural assembly for an aircraft outside-skin heat exchanger comprises an outside skin portion which defines an outer shape of the aircraft and forms a portion of a shell of the aircraft, wherein the outside skin portion has at least one recess. Primary structure here refers to the structural components of the aircraft fuselage, which usually comprise a load-bearing shell (outside skin) of the aircraft and also frames (also formers), stringers and other support structures arranged thereon. The outside skin portion can be any desired portion of the outside skin of the aircraft. In particular, the outside skin portion can be arranged on part of the aircraft fuselage. Alternatively or in addition, the outside skin portion can also be arranged on part of a wing or tail unit of the aircraft.

If the outside skin portion is located in a region of the aircraft that is not pressurized (for example, the aircraft belly (the so-called belly fairing)), the outside skin portion does not have to be continuous. Rather, the outside skin portion can have at least one opening. As a result, the unpressurized region of the aircraft, and, in particular, the air present therein, can also be used as a heat sink for the aircraft outside-skin heat exchanger.

Alternatively, the outside skin portion having the recess can be in such a form that, despite the recess, a gas-tight shell of the aircraft is formed. This is necessary, in particular, in portions of the aircraft in which the outside skin of the aircraft delimits or at least adjoins a pressurized region of the aircraft. In other words, the outside skin in the outside skin portion is produced so as to be continuous. Alternatively, the recess can be introduced into the outside skin portion and connected there in a gas-tight manner to the remainder of the outside skin of the outside skin portion. For example, an outside skin element forming the recess can be adhesively bonded, welded or otherwise fastened in a gas-tight manner at its outer border to the remainder of the outside skin of the outside skin portion. A continuous outside skin offers the advantage that the forces carried by the outside skin can be transmitted through the entire outside skin without possible weak points developing at the connection between the outside skin and the outside skin element forming the recess. Checking of the outside skin, in particular for gas tightness, is also facilitated by a continuous, one-piece outside skin.

For example, the outside skin portion can be produced from a composite material, wherein the recess is provided during forming of the outside skin portion, so that the composite material is continuous. Alternatively, the outside skin portion can also be produced from metal, wherein the recess can be produced, for example, by press forming.

The recess is directed in the direction towards the aircraft interior. In other words, the outside skin in the region of the recess is located further in the aircraft interior than the outside skin in the remaining region of the outside skin portion. For example, the outside skin in the region of the recess can have a particular radius, while in the region of the outside skin portion outside the recess the outside skin has a larger radius.

The primary structural assembly further comprises a heat transfer fluid connection which is adapted to guide a heat transfer fluid into the recess. For example, the heat transfer fluid connection can be adapted to guide a heat transfer fluid through the outside skin of the aircraft into the recess. The heat transfer fluid connection thus forms a passage through the outside skin of the aircraft through which a heat transfer fluid can be guided. It is thereby immaterial whether heat transfer fluid is actually guided through the heat transfer fluid connection or not.

In its simplest form, the heat transfer fluid connection can constitute an opening in the outside skin through which a heat transfer fluid line can be guided. In order still to achieve a gas-tight shell, the opening must be closed in a gas-tight manner by the heat transfer fluid line or (if a heat transfer fluid line is not used) a closure element. In another embodiment, the heat transfer fluid connection can be a connecting piece (for example coupling) of a heat transfer fluid line. This connecting piece can thereby be fitted or integrated in the outside skin portion in such a manner that, apart from a line cross-section for the heat transfer fluid, no further opening through the outside skin of the aircraft is present. The gas tightness of the outside skin portion is thereby ensured. The connecting piece can be configured to be self-closing, that is to say, when no heat transfer fluid channel or the like is connected to the connecting piece, an inner cross-section of the connecting piece for guiding the heat transfer fluid is closed.

The primary structural assembly can further comprise a structural element closing the recess. This structural element therefore has dimensions, most of which correspond to the associated dimensions of the recess. In other words, the recess is closed once the structural element has been inserted, and the surface of the outside skin outside the recess and the surface of the structural element are arranged flush, so that they form a continuous outer surface of the aircraft. Good aerodynamics of the aircraft can thereby be achieved.

The structural element does not necessarily have to have the same depth (considered in the radial direction towards the center of the aircraft) as the recess. For example, the structural element together with the outside skin of the aircraft arranged in the recess can form a cavity. Alternatively or in addition, the structural element can have a cavity which is delimited and defined on at least some sides by a portion of the structural element.

The structural element can be of lightweight construction, for example. The structural element can thus comprise a composite material or metal at least in some regions. In particular, a surface forming the outer side of the structural element, when it is inserted in the recess, can be produced from the composite material or metal. There is preferably used the same material as forms the outside skin of the aircraft in the outside skin portion. The structural element can also be formed in some regions of a foam, a honeycomb structure or a similar material having voids.

Finally, the primary structural assembly can have at least one holding means arranged in or at the recess, which holding means is adapted to hold the structural element closing the recess in the recess. The at least one holding means can be formed in the recess or in the region around the recess by the outside skin. In other words, the holding means is integrated in the outside skin portion.

Alternatively or in addition, a holding means can also be arranged on an inner side of the outside skin in the region of the recess or around the recess. The structural element can thereby have at least one portion which extends into the holding means, so that the structural element is secured in the recess by the holding means. In the case of a gas-tight shell, such a holding means arranged on the inner side of the outside skin must still ensure this gas tightness in the region of the outside skin portion. For example, the holding means can have a housing portion facing towards the inner side of the aircraft, which housing portion is connected in a gas-tight manner to the inner side of the outside skin of the aircraft.

In an embodiment variant, the primary structural assembly can further comprise at least one heat transfer fluid channel arranged in the structural element closing the recess. In other words, the structural element has a heat transfer fluid channel through which a heat transfer fluid can flow. The heat transfer fluid can be used, for example, in a cooling circuit, wherein it is conducted in the heated state into the heat transfer fluid channel in order to release heat energy. The heat transfer fluid channel can be adapted, for example, to function as a heat exchanger or to comprise a heat exchanger at least in a portion. The heat transfer fluid channel is therefore correspondingly dimensioned, for example distinguished by a long line length, and so arranged in the structural element that the heat transfer fluid channel is thermally coupled with a cooling medium. Ambient air in the immediate surrounding area of the aircraft, for example, can here be used as the cooling medium.

The heat transfer fluid channel can further have a wall delimiting the heat transfer fluid channel, which wall also forms an outer side of the structural element. The heat transfer fluid channel can thus release heat energy to the ambient air on the outer side of the structural element (forming the outer side of the aircraft in the state fitted in the recess). This outer side of the structural element can thereby be designed to be smooth in an aerodynamically advantageous manner and/or can be provided in some regions with cooling fins in order to ensure better evacuation of heat energy to the ambient air. The heat transfer fluid channel can also be so guided in a meandering or other manner through the structural element that the wall delimiting the heat transfer fluid channel occupies as large a surface area as possible on the outer side of the structural element.

Alternatively or in addition, the heat transfer fluid channel can be spanned by an outside wall of the structural element. The outside wall of the structural element can thereby be thermally coupled with the heat transfer fluid channel, in order to permit optimum release of heat energy of the heat transfer fluid to the ambient air via the outside wall of the structural element. For example, the heat transfer fluid channel can be fastened to an inner side of the outside wall of the structural element in a thermally conducting manner, for example by means of thermally conductive adhesive, by welding or by one-piece manufacture.

Likewise alternatively or in addition, the heat transfer fluid channel can be in the form of a plurality of microchannels. Such microchannels can have a (an inside) diameter of between 0.8 mm and 2 mm, for example. A long line length for the heat transfer fluid channel can thereby be achieved, which in turn permits good release of heat energy.

All these variants have the effect that the heat transfer fluid channel functions as an outside-skin heat exchanger. This can apply to (almost) the entire heat transfer fluid channel within the structural element or to only a specific portion thereof, which is located in the vicinity of the outer side of the structural element.

Furthermore, in an embodiment variant, the heat transfer fluid channel can reach through the heat transfer fluid connection into the interior of the aircraft. In other words, the heat transfer fluid channel in the heat transfer fluid connection passes through the outside skin of the aircraft. This allows the heat transfer fluid channel to be connected in the interior of the aircraft. The heat transfer fluid channel and/or the heat transfer fluid connection can thereby be so configured that there is a gas-tight closure between the inner side and the outer side of the aircraft outside skin in the region of the heat transfer fluid connection.

Alternatively, the heat transfer fluid channel can be fluidically coupled with the heat transfer fluid connection, so that the heat transfer fluid flows through the heat transfer fluid connection and then through the heat transfer fluid channel. In particular when the heat transfer fluid connection is implemented by a connecting piece, the heat transfer fluid channel can be connected to (coupled with) the connecting piece in order to effect a fluidic connection. The connecting piece can in turn be connected to a heat transfer fluid line in the interior of the aircraft, so that fluidic coupling of the heat transfer fluid channel with the heat transfer fluid connection also means fluidic coupling of the heat transfer fluid channel with the heat transfer fluid line in the interior of the aircraft.

In a further embodiment variant, the heat transfer fluid connection can have a first portion, through which the heat transfer fluid is guided through the outside skin of the aircraft to the heat transfer fluid channel, and a second portion, through which the heat transfer fluid, after flowing through the heat transfer fluid channel, is guided through the outside skin of the aircraft into the interior of the aircraft. On the one hand, an opening forming the heat transfer fluid connection can be of a sufficient size that two portions of the heat transfer fluid channel can be guided into the interior of the aircraft. On the other hand, the heat transfer fluid connection can comprise two or more connecting pieces (couplings) through which heat transfer fluid can flow into or out of the heat transfer fluid channel. The structural element with the heat transfer fluid channel can thus be connected quickly and easily to a heat transfer fluid line in the interior of the aircraft. The primary structural assembly therefore provides the possibility of connecting a heat transfer fluid channel regardless of whether a structural element with or without a heat transfer fluid channel is installed in the recess.

In an alternative or additional embodiment variant, the primary structural assembly can further comprise at least one cooling air channel arranged in the structural element closing the recess. Cooling air flowing through the cooling air channel is thereby thermally coupled with the heat transfer fluid flowing through the heat transfer fluid channel. Thermal coupling between the heat transfer fluid and the cooling air permits an exchange of heat energy from the heat transfer fluid to the cooling air. The structural element can thus form a heat exchanger for a cooling system.

In a further embodiment, at least one wall delimiting the heat transfer fluid channel can delimit at least a portion of the cooling air channel. In other words, the cooling air channel can simply be in the form of a cavity which is defined on at least one side by the wall delimiting the heat transfer fluid channel. Alternatively or in addition, the heat transfer fluid channel can be spanned by a wall which faces the cooling air channel and is thermally coupled with the heat transfer fluid channel.

The cooling air channel and/or the heat transfer fluid channel can further be so dimensioned and/or formed that further portions of the cooling air channel are delimited/defined by the heat transfer fluid channel. The surface area at which the cooling air is able to flow along the wall/walls delimiting the heat transfer fluid channel can thereby be increased, whereby the thermal coupling is improved.

In yet a further embodiment, the cooling air channel in the form of a cavity can reach into the interior of the aircraft. In particular in an unpressurized region of the aircraft, the cooling air channel can extend or simply open into the unpressurized region of the aircraft. A cooling air conveying device thus permits operation of the aircraft outside-skin heat exchanger (the dissipation of heat energy of the heat transfer fluid from the heat transfer fluid channel) both during flight operation and during ground operation of the aircraft. The primary structure of the aircraft must thereby be adapted to only a small extent or not at all to this form of the aircraft outside-skin heat exchanger.

Alternatively or in addition, cooling fins can be formed in the cooling air channel and/or on a side of the heat transfer fluid channel facing the outer side of the structural element, which cooling fins likewise increase the surface area along which the cooling air flows.

In an embodiment variant, the primary structural assembly can further comprise a cooling air connection which is adapted to guide cooling air through the outside skin of the aircraft. The cooling air channel can thereby be fluidically coupled with the cooling air connection, so that the cooling air flowing in the cooling air channel flows through the cooling air connection. In other words, the cooling air connection is configured similarly to the heat transfer fluid connection. Accordingly, on the one hand it can simply constitute an opening through which the cooling air flows and can flow further on the inner side of the outside skin of the aircraft (either in a free space within the aircraft or in a cooling air line provided specifically for that purpose in the interior of the aircraft). On the other hand, the cooling air connection can comprise at least one connecting piece to which the cooling air channel is connected. The connecting piece can be configured to be self-closing, that is to say, when no cooling air channel is connected to the connecting piece, an inner cross-section of the connecting piece for guiding the cooling air is closed.

Alternatively or in addition, the structural element can have at least one opening which permits a fluidic connection between a cooling air channel and the external surrounding area. The cooling air channel can thus be fluidically connected with ambient air on the outer side of the outside skin portion of the aircraft. The opening can be implemented in the form of a ventilation slot in the structural element, wherein a length of the ventilation slot corresponds substantially to a length of the cooling air channel in the structural element. Alternatively or in addition, the at least one opening can be implemented in the form of at least one hole or through-hole through the material of the structural element. Cooling air can thereby be conducted in a simple manner from the surrounding area of the aircraft into the cooling air channel. A cooling air channel can accordingly also be supplied with cooling air when no cooling air connection is provided in the primary structural assembly. The cooling air can of course also optionally be conducted into/out of the cooling air channel via the at least one opening in the structural element and/or the cooling air connection.

In another embodiment variant, the recess can comprise at least one side wall, wherein the holding device is arranged at or in the side wall. The recess can be in the form of a substantially concave recess (projecting into the interior of the aircraft), whereby the forces carried by the outside skin of the aircraft can readily also be transmitted through the recess. On the other hand, the recess can also be of stepped form, so that at least one side wall of the recess is obtained. This permits a structural element having the same shape, so that it can be formed more stably in its edge regions. Transitions between the structural element and outside skin surrounding the recess are also easier to configure. The side wall can run substantially perpendicularly to the outside skin of the outside skin portion outside the recess. "Substantially perpendicularly" is here understood as meaning an arrangement at an angle of between 75° and 105°, preferably between 80° and 100°, and particularly preferably between 85° and 95°.

In a preferred embodiment, a further primary structural component, such as, for example, a stringer or former (frame), is arranged on the inner side of a side wall of the recess (that is to say on the inner side of the outside skin of the aircraft). The stability of the outside skin can thereby be ensured despite the recess. The side wall of the recess can thereby also be fastened to the primary structural component.

The holding device can be arranged on the side wall as a separate structural element. Alternatively, the holding device can also be integrated in the side wall or formed thereby. In both cases, the holding device is adapted to be brought into engagement with at least a portion of the structural element in order to ensure that the structural element is securely fastened in the recess. The holding device can form a frictional and/or positive connection with the structural element.

In yet a further embodiment variant, the structural element closing the recess can have at least one structural element holding means. The structural element holding means can be adapted to hold the structural element in the recess by positive and/or frictional engagement. The recess can thereby be so formed that the structural element holding means can be brought into positive and/or frictional engagement with the recess in order to hold the structural element securely. For example, the side wall of the recess can form an undercut, that is to say an opening of the recess in the region of the outside skin of the outside skin portion is smaller than the surface of the base of the recess. The structural element holding means can thereby be so configured that it engages positively and/or frictionally into the undercut.

Alternatively or in addition, the structural element holding means can be connected by positive engagement and/or frictional engagement to the holding means arranged at or in the recess. In other words, the holding means or holding device arranged in the recess and the structural element holding means can comprise corresponding portions which can be brought into engagement in order to hold the structural element securely in the recess.

In an embodiment variant, the holding means and/or the structural element holding means has at least one carrier-shaped element which is arranged in the recess. The structural element can be fastened thereto by means of a screw connection.

In an alternative or additional embodiment variant, the structural element is adhesively bonded in the recess. A holding device and/or structural element holding means can thus be omitted, whereby the primary structural assembly can be made lighter.

In another embodiment variant, the structural element holding means and/or the holding means arranged in the recess can be adapted to hold the structural element in the recess in such a manner that the heat transfer fluid channel is connected in a fluid-tight manner to the heat transfer fluid connection. In other words, the heat transfer fluid connection and/or the heat transfer fluid channel can be adapted to produce a fluidic connection when the structural element is fastened by means of the structural element holding means and/or the holding means arranged in the recess. This can be achieved on the one hand in that the structural element, owing to the structural element holding means and/or the holding means arranged in the recess, assumes a specific position in the recess, in which the heat transfer fluid channel likewise assumes a specific position relative to the heat transfer fluid connection, whereby the fluidic connection is fixed. On the other hand, the structural element holding means and/or the holding means arranged in the recess can be adapted to move the structural element into an end position in the recess, wherein, as a result of the movement of the structural element, the heat transfer fluid channel is at the same time connected to the heat transfer fluid connection (for example, the heat transfer fluid channel is coupled with a connecting piece of the heat transfer fluid connection).

In yet another embodiment variant, the recess can have over its entire surface a substantially equal depth into the interior of the aircraft. In other words, the outside skin of the aircraft runs in the recess along a curve or region which would correspond to the outside skin of the aircraft if no recess were present, but further in the interior of the aircraft. For example, the outside skin of the aircraft in the recess can have a shape concentric with the outside skin of the aircraft outside the recess.

In a further embodiment variant, the structural element can comprise a cover which is flush with the outside skin of the aircraft outside the recess. In other words, the cover of the structural element is so arranged that it forms a continuous flush surface with the outside skin of the aircraft outside the recess when the structural element is inserted in the recess. The cover can form the entire structural element. For example, the structural element can consist only of the cover and comprise neither a heat transfer fluid channel nor a cooling air channel. Alternatively, the cover can represent only an (external) portion of the structural element, wherein the remaining region of the structural element is formed, for example, by a heat transfer fluid channel. The structural element can thereby be in such a form that it comprises a heat transfer fluid channel of a size that is designed for a specific cooling system. The primary structural assembly, on the other hand, also allows a structural element having heat transfer fluid channels of different sizes, a different number of heat transfer fluid channels, with or without any number of cooling air channels and the like to be received (in the recess). The primary structural assembly thereby provides a stable and gas-tight outer shell for the aircraft, while at the same time aircraft outside-skin heat exchangers which correspond to a current requirement can be inserted in the recess of the primary structural assembly. This flexible configuration also allows the primary structural assembly to be modified in a simple manner only from the outside, by exchanging the structural element.

Likewise alternatively, a structural element can be of such a form that it comprises only one or a plurality of cooling air channels. This makes it possible, for example, to use a structural element that has an air inlet and at least one cooling air channel, wherein the cooling air can be conducted through a cooling air connection into the interior of the aircraft. Accordingly, the primary structural assembly also allows an air inlet, for example a (standardized) ram air inlet, to be arranged in the region of the recess. A cooling air channel in the structural element can thus also be configured as a ram air channel. Of course, the structural element can also comprise (only) an air outlet, wherein the one or the plurality of cooling air channels in the structural element are connected to the air outlet, so that the structural element and the cooling air channel/channels arranged therein can serve as an exhaust air line.

In a further variant, the cooling air channel in the structural element can also not be connected to the interior of the aircraft (that is to say can be without a cooling air connection). Instead, the structural element can have a cooling air inlet and a cooling air outlet, which is fluidically connected to the cooling air channel. The structural element can thus have a conventional ram air channel. Likewise in a further variant, a heat transfer fluid channel can be arranged in such a ram air channel within the structural element. A heat exchanger can thereby subsequently be installed in the aircraft in a ram air channel.

In another embodiment variant, the primary structural assembly can further comprise at least one cooling air channel arranged outside the recess and adjoining the recess. This cooling air channel arranged outside the recess can be located on the inner side of the outside skin of the primary structural assembly. For example, the cooling air channel arranged outside the recess can further adjoin the cooling air connection, so that it forms a continuous cooling air channel with the cooling air channel inside the structural element. This allows the cooling air to be used also in regions inside the aircraft.

In a further embodiment variant, the primary structural assembly can further comprise a cooling air conveying device which is arranged on a side of the outside skin portion facing the interior of the aircraft. In other words, the cooling air conveying device is provided in the interior of the aircraft. The cooling air conveying device can thereby be fluidically coupled with the cooling air channel in the structural element and/or with the cooling air channel outside the recess. In other words, with the cooling air conveying device, cooling air can be conveyed through any cooling air channel in order to ensure evacuation of the heat energy released, for example, by the heat transfer fluid. The cooling air conveying device can thereby be so adapted that it conveys cooling air from the interior of the aircraft via the cooling air connection into the cooling air channel of the structural element. The cooling air can thereby leave the cooling air channel of the structural element, for example, via corresponding openings in the structural element. Alternatively, the cooling air conveying device can be so adapted that it conveys cooling air through the cooling air channel of the structural element into the interior of the aircraft. The cooling air conveying device can of course also be adapted optionally to convey cooling air into the aircraft or out of the aircraft through one or more cooling air channels.

According to a further aspect for better understanding of the present disclosure, an aircraft comprises at least one primary structural assembly according to the first aspect. In particular, an aircraft can comprise a plurality of primary structural assemblies. The recess of each primary structural assembly can thereby be equipped with the same structural element or with different structural elements. This allows structural elements having a heat transfer fluid channel to be attached at specific locations of the aircraft (at specific associated primary structural assemblies of the aircraft) that are situated in the vicinity of a cooling system provided in the aircraft. Line lengths for the cooling system can thus be made significantly shorter, whereby weight for the aircraft is saved. An aircraft can also be adapted to a new cooling situation by exchanging corresponding structural elements. If, for example, a cooling system is laid at another location within the aircraft or a cooling system is newly installed in the aircraft, the associated heat exchanger in the structural element can also be moved to an appropriate location (primary structural assembly). It is likewise conceivable to attach additional heat exchangers (in the form of structural elements having a heat transfer fluid channel) to the aircraft if a more powerful cooling system has a larger amount of heat to release. All unused recesses of the primary structural assemblies in the aircraft can be closed by structural elements that do not comprise a heat transfer fluid channel and/or cooling air channel but, for example, consist only of a cover.

According to a third aspect for better understanding of the present disclosure, a method for attaching an aircraft outside-skin heat exchanger is described. The method comprises at least the following steps:

providing an outside skin portion having at least one recess, wherein the outside skin portion defines an outer shape of an aircraft and forms a portion of a shell of the aircraft;

inserting a structural element closing the recess into the recess, wherein the structural element comprises a heat transfer fluid channel;

establishing a fluidic connection between the heat transfer fluid channel and a heat transfer fluid connection which is adapted to guide a heat transfer fluid into the recess; and fastening the structural element in the recess by means of a holding means arranged therein.

The structural features used in the method can of course correspond to those of the first and second aspects.

The method can further be supplemented in that an already fastened structural element is detached from the recess and removed and then replaced by another structural element. The other structural element can be inserted into the recess according to the above-mentioned steps. The other structural element can comprise, for example, a heat transfer fluid channel of a different size to the structural element that has been removed or even no heat transfer fluid channel at all. Structural elements with or without a heat exchanger can thus be exchanged from outside the aircraft, whereby significant working time can be saved. The regions in the interior of the aircraft are usually difficult to reach if an outside-skin heat exchanger has to be replaced or exchanged.

Furthermore, the aspects, embodiments and variants described above can of course be combined without this explicitly being described. Each of the described embodiment variants is accordingly optionally to be seen with each of the aspects, embodiments and variants or combinations thereof. The present disclosure is accordingly not limited to the individual embodiments and embodiment variants in the described order or to a specific combination of the aspects and embodiment variants.

BRIEF DESCRIPTION OF THE DRAWINGS

Preferred exemplary embodiments of the invention will now be explained in greater detail with reference to the accompanying schematic drawings, in which:

FIG. 2 shows, schematically, a cross-section of a primary structural assembly;

FIG. 3 shows, schematically, a side view of an aircraft having a primary structural assembly;

FIG. 12 shows, schematically, a cross-section of an aircraft having two primary structural assemblies;

FIG. 13 shows, schematically, a cross-section of an aircraft; and

DETAILED DESCRIPTION OF THE PREFERRED EMBODIMENTS

Figure 1:
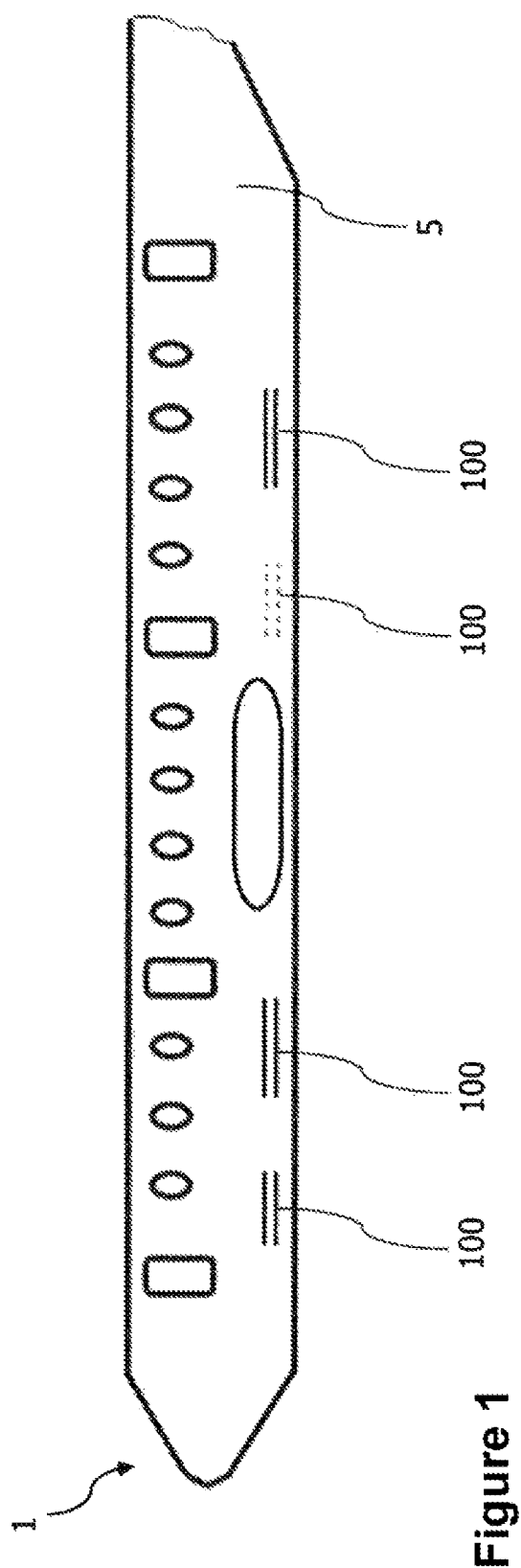
FIG. 1 shows, schematically, a detail of an aircraft.

FIG. 1 shows, schematically, a detail of an aircraft 1 in a side view. The aircraft 1 comprises an outer shell in the form of an outside skin 5 which defines an outer shape of the aircraft 1. The aircraft 1 can, as shown in FIG. 1, comprise one or more primary structural assemblies 100. The primary structures 100 shown in FIG. 1 are indicated only schematically by two lines, wherein they are not limited to the dimensions shown.

FIG. 2 shows, schematically, a cross-section of such a primary structural assembly 100. It will thus be seen that the primary structural assembly 100 comprises an outside skin portion 5 which defines an outer shape of the aircraft 1 and forms a portion of a shell of the aircraft. In order to simplify the drawing, the outside skin portion 5 is depicted with straight lines arranged perpendicularly to one another. The outside skin portions 5 of an aircraft 1 are usually curved.

The profile of the outside skin 5 forms a recess 10, wherein the outside skin 5 at least in one portion is arranged further in the interior of the aircraft 1 (on the right in FIG. 2) than the portion of the outside skin 5 located outside the recess 10. The recess 10 is here shown only schematically with side walls 11, 12 running perpendicularly to the outside skin 5. The side walls 11, 12 can of course be at other angles relative to the outside skin 5, be of curved form or even not explicitly be in the form of a side wall but rather extend in the form of concave and/or convex curves from the middle of the recess 10 to the remainder of the outside skin 5 located outside the recess 10.

The primary structural assembly 100 can further have at least one holding means 30 arranged in or at the recess 10. Such a holding means 30 is adapted to hold a structural element 50 closing the recess 10 (which structural element will be explained in greater detail with reference to FIGS. 3 to 9) in the recess 10. The holding means 30 is shown by way of example on a side wall 12 of the recess 10. The holding means 30 (or further holding means 30) can of course also be arranged at another location of the primary structural assembly 100. Merely by way of example, two further holding means 30 on the inner side of the outside skin 5 in the region of the depression 10 are depicted in FIG. 2 by broken lines.

FIG. 3 shows, schematically, a side view of an aircraft 1 having a primary structural assembly 100. The primary structural assembly 100, and in particular its recess 10, can extend further in the longitudinal direction (X-axis) of the aircraft 1 than perpendicular thereto (in the direction of the Z-axis). The size of the recess 10 can, however, be chosen freely depending on the purpose for which the primary structural assembly 100 is provided.

In FIG. 3 there is shown a heat transfer fluid connection 20 which is adapted to guide a heat transfer fluid through the outside skin 5 of the aircraft 1. In particular, a first portion 20a of the heat transfer fluid connection 20 on one side of the recess 10 and a second portion 20b of the heat transfer fluid connection 20 on another side of the recess 10 are shown. The position of the heat transfer fluid connection 20 or of the first or second portion 20a, 20b of the heat transfer fluid connection 20 is not limited to the position shown but can be situated at any location at or in the immediate vicinity of the recess 10.

FIGS. 4 to 7 each show, schematically, a cross-section of a primary structural assembly 100 according to a variant. The direction of view of FIGS. 4 to 7 is, for example, in the longitudinal direction (in the direction of the X-axis) of the aircraft 1. There is shown in particular in FIGS. 4 to 7 a structural element 50 which has been inserted into the recess 10. The variant shown in FIG. 4 comprises a structural element 50 having two heat transfer fluid channels 51, 52 arranged therein. The heat transfer fluid channels 51, 52 can be fluidically coupled with the heat transfer fluid connection 20, so that heat transfer fluid flows through the heat transfer fluid connection 20 and then through the heat transfer fluid channel 51, 52. The portions 20a, 20b of the heat transfer fluid connection 20 can thereby be used to each be associated with a heat transfer fluid channel 51, 52. For example, the first portion 20a of the heat transfer fluid connection 20 can comprise a feed and a discharge for heat transfer fluid, both of which are fluidically coupled with the heat transfer fluid channel 51. Likewise, the second portion 20b of the heat transfer fluid connection 20 can comprise a feed and a discharge for heat transfer fluid, both of which are fluidically coupled with the further heat transfer fluid channel 52.

Alternatively, heat transfer fluid can also flow through the first portion 20a of the heat transfer fluid connection 20 into the heat transfer fluid channel 51, the heat transfer fluid channel 51 can be fluidically coupled with the further heat transfer fluid channel 52, and the heat transfer fluid can flow out again through the further heat transfer fluid channel 52 via the second portion 20b of the heat transfer fluid connection 20.

In any case, a heat transfer fluid channel 51, 52 can be coupled with the heat transfer fluid connection 20 via a connecting piece 56, as is shown in the detail view of FIG. 3. The connecting piece 56 and the first portion 20a shown in FIG. 3 of the heat transfer fluid connection 20 can be adapted to be fitted into one another or to one another and thereby establish a fluidic connection. For example, the connecting piece 56 and the first portion 20a of the heat transfer fluid connection 20 can be in the form of corresponding coupling pieces which can be connected to one another. The second portion 20b of the heat transfer fluid connection 20 can also be correspondingly formed. Likewise, the further heat transfer fluid channel 52 can also be equipped with at least one corresponding connecting piece 56.

The primary structural assembly 100 can further comprise at least one cooling air channel 53 arranged in the structural element 50 closing the recess 10. The cooling air channel 53 can be flowed through by cooling air which is thermally coupled with the heat transfer fluid flowing through the heat transfer fluid channel 51, 52. In other words, heat energy from the heat transfer fluid in the heat transfer fluid channel 51 and/or the further heat transfer fluid channel 52 can be transmitted to the cooling medium (here air) in the cooling air channel 53.

Figure 4:
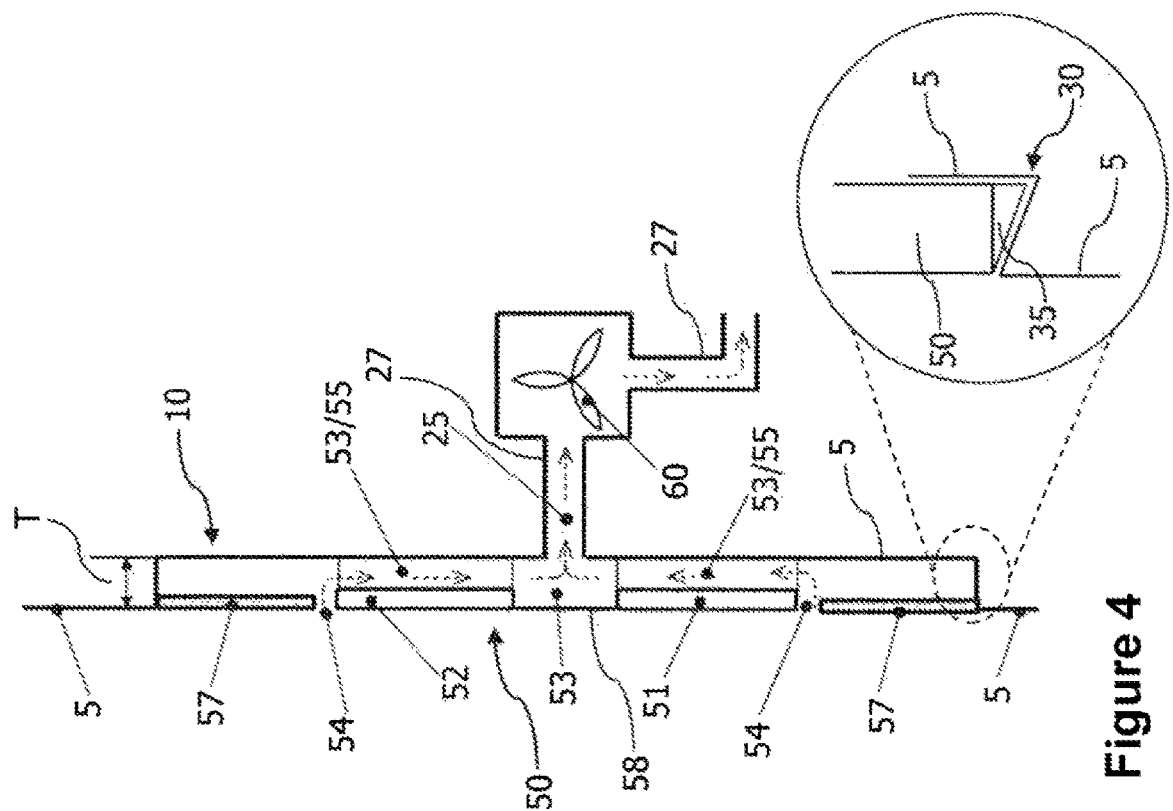

In the region of the central region shown in FIG. 4 of the cooling air channel 53, the heat transfer fluid channels 51, 52 are shown spaced apart from one another. In this case, the cooling air channel 53 can be closed to the ambient air (towards the outer side located on the left in FIG. 4 of the aircraft 1). For example, an outside wall 58 of the structural element 50 can close the cooling air channel 53. The outside wall 58 can further also span the at least one heat transfer fluid channel 51, 52. A continuous outer surface of the structural element 50 can thereby be created, whereby the aerodynamics of the primary structural assembly 100 is improved. In an alternative embodiment variant, the heat transfer fluid channels 51, 52 can also abut one another, so that the outside wall 58 is not necessary.

As is shown in FIG. 4, the heat transfer fluid channels 51, 52 can be so arranged in the structural element 50 that openings 54 are formed, via which openings air is able to flow from a surrounding area of the aircraft 1 into the cooling air channels 53 (or conversely via which air is able to flow into the surrounding area of the aircraft 1 from the cooling air channels 53). In order to guide the cooling air over the entire wall 51a, 52a (FIGS. 8 and 9) delimiting the heat transfer fluid channel 51, 52, cooling fins or lamellae 55, which guide the cooling air stream, can be provided in the cooling air channels 53. The cooling fins 55 shown in FIG. 4 run parallel to the plane of the drawing of FIG. 4 and can be fastened, for example, to the inside wall 51a, 52a delimiting the heat transfer fluid channel 51, 52. The cooling fins 55 can of course have any desired orientation and shape for achieving a good thermal connection between the cooling air stream and the heat transfer fluid.

The cooling air can optionally be conveyed by a cooling air conveying device 60. For this purpose, the primary structural assembly 100 can comprise a cooling air connection 25 which is adapted to guide cooling air through the outside skin 5 of the aircraft 1 (into the interior of the aircraft 1). The cooling air channel/channels 53 is/are fluidically coupled for this purpose with the cooling air connection 25, so that the cooling air flowing in the cooling air channel 53 flows through the cooling air connection 25. As is apparent from FIGS. 2 to 4, the primary structural assembly 100 can comprise at least one cooling air channel 27 which is arranged outside the recess 10 and adjoins the recess 10. The cooling air conveying device 60 can be arranged at any desired location of the cooling air channel 27. Finally, the conveyed cooling air can leave the aircraft 1 again via an air outlet 65. For example, as shown in FIG. 3, the cooling air conveying device 60 can be arranged in a lower region of the aircraft 1. The air conveying device 60 can likewise be arranged in a region of the aircraft 1 that is not pressurized (e.g., in the so-called "belly fairing").

The bottom end of the structural element 50 shown in detail in FIG. 4 exhibits an example of a structural element holding means 35, which is connected by positive engagement and/or frictional engagement to the holding means 30 arranged in the recess 10. The example of a holding means 30 from FIG. 4 is in the form of an undercut, wherein the structural element holding means 35, which is likewise by way of example, has a shape corresponding to the undercut. For example, the structural element holding means 35 can be integrated in the structural element 50 and moved out manually or automatically once the structural element 50 has been inserted into the recess 10 (at the bottom in FIG. 4). A positive and/or frictional connection with the holding means 30 is thereby established.

Finally, the structural element 50 can also comprise a cover 57 which is adapted to be flush with the outside skin 5 of the aircraft 1 outside the recess 10. In particular when the structural element 50 has been inserted into the recess 10 and is fastened therein, the cover 57 can form a continuous (flush) surface with the remainder of the outside skin 5 of the aircraft 1 outside the recess 10. The cover 57 can optionally also comprise a sealing element which closes a possible gap between the structural element 50 and the outside skin 5 outside the recess 10. The structural element 50 can thereby close the recess 10 in an aerodynamically optimal manner.

According to a variant of the present disclosure, a structural element 50 can consist solely of a cover 57 which closes the entire recess 10. This is shown by way of example in FIG. 1 in the form of the primary structural assembly 100 illustrated by a broken line. While a primary structural assembly 100 having at least one heat transfer fluid channel 51, 52 is provided at a different location of the aircraft 1, a further primary structural assembly 100 (the second from the right in FIG. 1) without a heat transfer fluid channel 51, 52 and formed solely by a cover 57 can be provided. As a result, the aircraft 1 can be equipped with any desired number of primary structural assemblies 100, while heat transfer fluid channels 51, 52 (and thus outside-skin heat exchangers) are arranged only at the positions on the outer side of the aircraft 1 at which they are needed, or even not at all.

For example, outside-skin heat exchangers can be installed in a recess 10 when there is on the corresponding inner side of the aircraft 1 a cooling system or other system which must cool a heat transfer fluid. The same is also true for structural elements 50 which comprise only at least one cooling air channel 53 and an opening 54. In addition, the primary structural assembly 100 can also have a cooling air connection 25. As a result, an air inlet or air outlet can be installed at any desired primary structural assembly 100 in order to supply a system at the corresponding position in the interior of the aircraft 1 with ambient air or to discharge exhaust air to the surrounding area.

Furthermore, the recess 10 can have over its entire surface a substantially equal depth T into the interior of the aircraft 1. Correspondingly, each structural element 50 can have a thickness D (see FIG. 8) corresponding to the depth T, in order to close the recess 10, where possible, in such a manner that the outer side of the structural element 50 forms a continuous flush surface with the outside skin 5 of the aircraft 1 located around the recess 10. Furthermore, the variants of the structural element 50 can be used in any recess 10 of any desired primary structural assembly 100, whereby a certain standardization of the primary structural assembly 100 is achieved. In particular, the aircraft 1 can be equipped with identical primary structural assemblies 100 so that, if required, necessary structural elements 50 can correspondingly be inserted from outside on the aircraft 1. If each primary structural assembly 100 is equipped with a heat transfer fluid connection 20 and a cooling air connection 25, an aircraft outside-skin heat exchanger, an air inlet and/or an air outlet or merely a cover can be installed at any time at any primary structural assembly 100.

Figure 5:
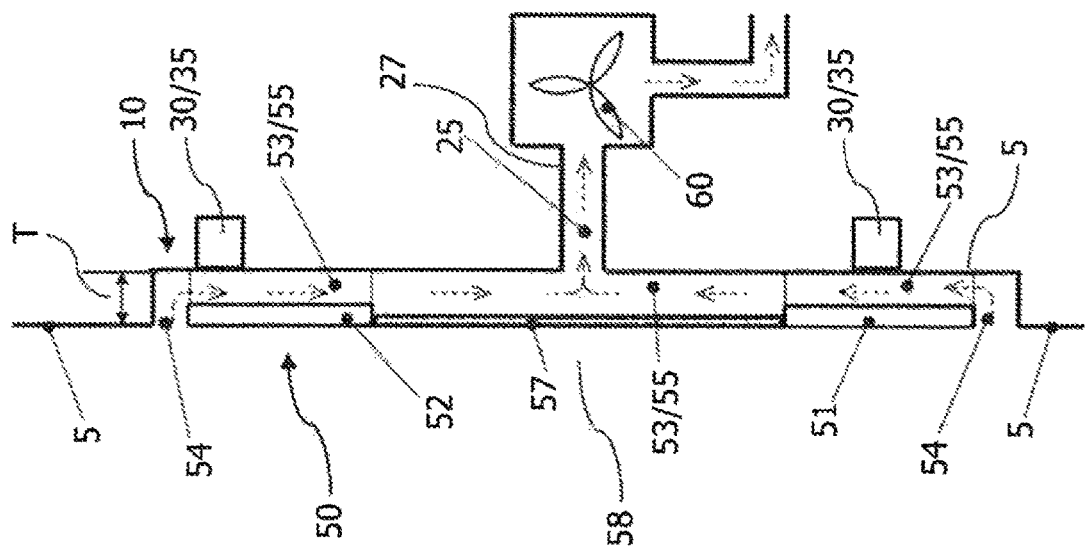
FIGS. 4 to 7 each show, schematically, a variant of a cross-section of a primary structural assembly.

FIG. 5 shows a further variant of a structural element 50. In this connection, only the differences with respect to the variant according to FIG. 4 will be described, since all the remaining components have the same function. In particular, the arrangement of the heat transfer fluid channels 51, 52 has changed, so that they are arranged on an outer side of the structural element 50. Cooling air can thus flow through the openings 54 around the external heat transfer fluid channel 51, 52, whereby a larger surface area of the heat transfer fluid channel 51, 52 is flowed around by cooling air and thus the release of heat energy to the cooling air is improved. Furthermore, the structural element 50 must merely comprise a cover 57 arranged between the two heat transfer fluid channels 51, 52.

Although in the variant according to FIG. 4 the structural element can be in multi-part form, for example the covers 57 can be inserted as separate components into the recess 10 (for example once the structural element 50 with the heat transfer fluid channels 51, 52 has thereby been inserted smaller and thus more easily into the recess 10). Installation is thereby facilitated. In the variant according to FIG. 5, on the other hand, the entire recess 10 can be closed in a single installation step, since only a single structural element 50 is inserted into the recess 10. Moreover, sealing elements do not have to be provided in the region of the openings 54, since these openings 54 (for example in the form of at least one slot along the structural element 50 and the recess 10) are necessary for receiving ambient air.

Only by way of example, holding means 30 of the primary structural assembly 100 are also shown in FIG. 5, into each of which holding means a corresponding structural element holding means 35 is inserted. This can be, for example, a plug-in connection, an adhesive connection, a magnetic holding device, a screw connection 36 (FIG. 11), etc. Owing to the openings 54 provided in the edge region of the structural element 50, a holding means 30 provided at the bottom of the recess 10 (in FIG. 5 on the right-hand side of the recess 10) is more advantageous, since the openings 54 and the following cooling air channel 53 are not interrupted and as large a cooling air stream as possible is made possible.

Figure 6:
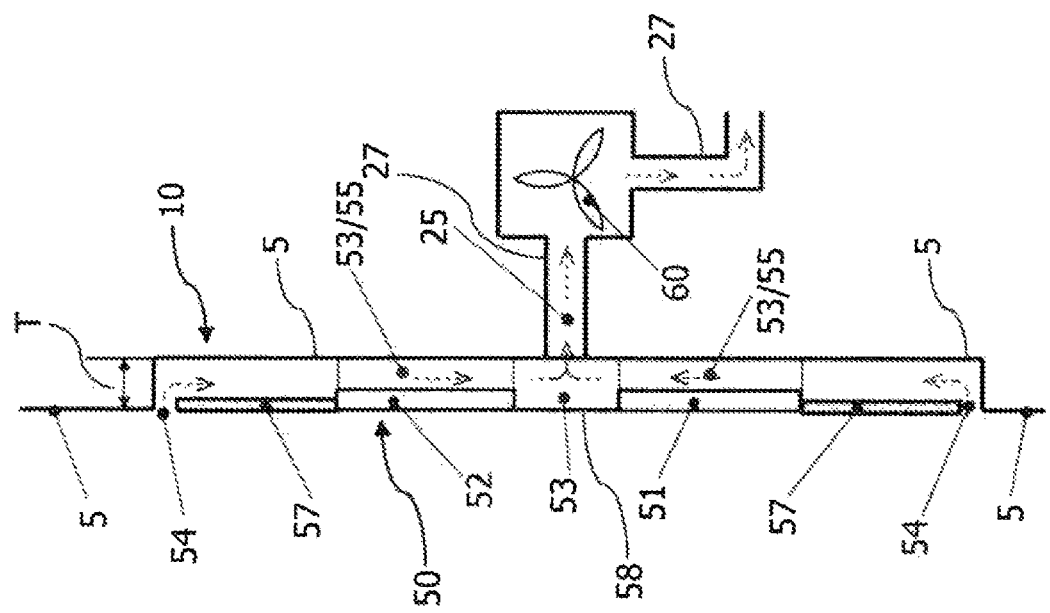

FIG. 6 shows a further variant of a structural element 50, or primary structural assembly 100, which is configured similarly to the variant according to FIG. 4. In particular the portion located in the central region of the structural element 50 and having the heat transfer fluid channels 51, 52 and the cooling air channel 53 corresponds to the variant from FIG. 4. However, covers 57 are provided on the structural element 50, which covers end outside the recess 10 shortly before the outside skin 5 and form openings 54 there for a cooling air inlet or outlet. As described above, the cover 57 can thereby already be attached to the structural element 50, so that this can be inserted into the recess 10 as a component. In the variant according to FIG. 4, the covers 57 can also be attached separately in the recess 10.

The variant according to FIG. 6 further offers the advantage that a greater chimney effect can be achieved in the cooling air channel 53. The aircraft outside-skin heat exchanger shown schematically in FIG. 6 can thus be used also in ground operation and when the cooling air conveying device 60 is switched off or not present.

Figure 7:
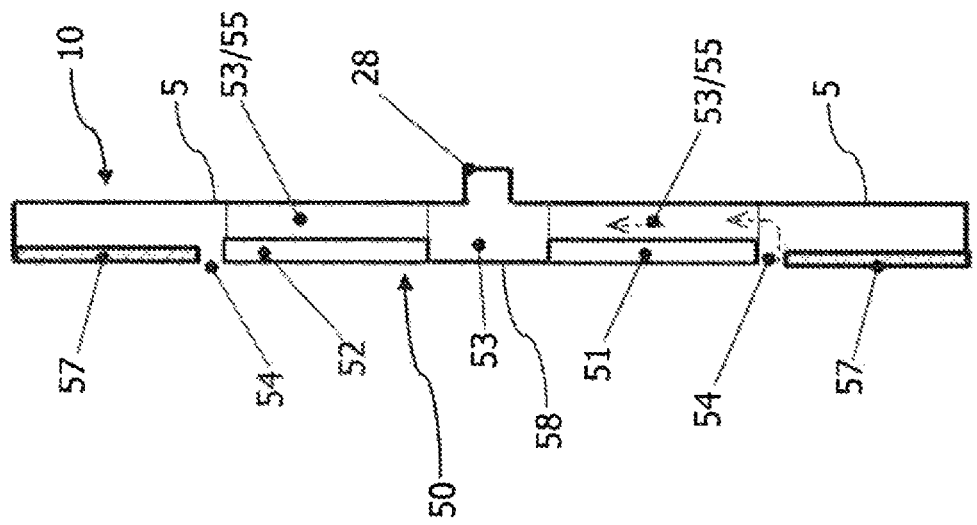

FIG. 7 in turn shows a variant of a primary structural assembly 100 which does not have a cooling air conveying device 60 or a cooling air channel 27 arranged outside the recess 10. The cooling air connection 25 can thereby be closed by a closure element 28. Alternatively, the primary structural assembly 100 may also not comprise a cooling air connection 25, wherein the closure element 28 is also not required.

Figure 10:
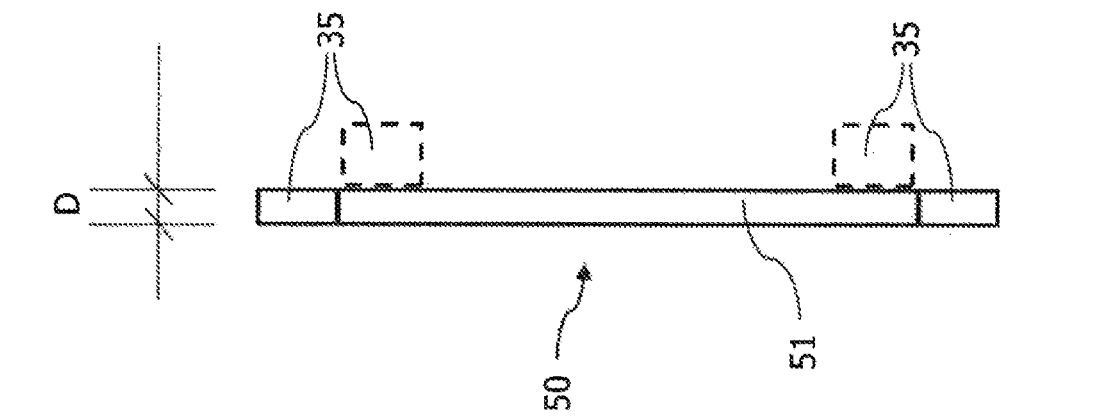
FIGS. 8 to 10 each show, schematically, a variant of a cross-section of a structural element.
Figure 9:
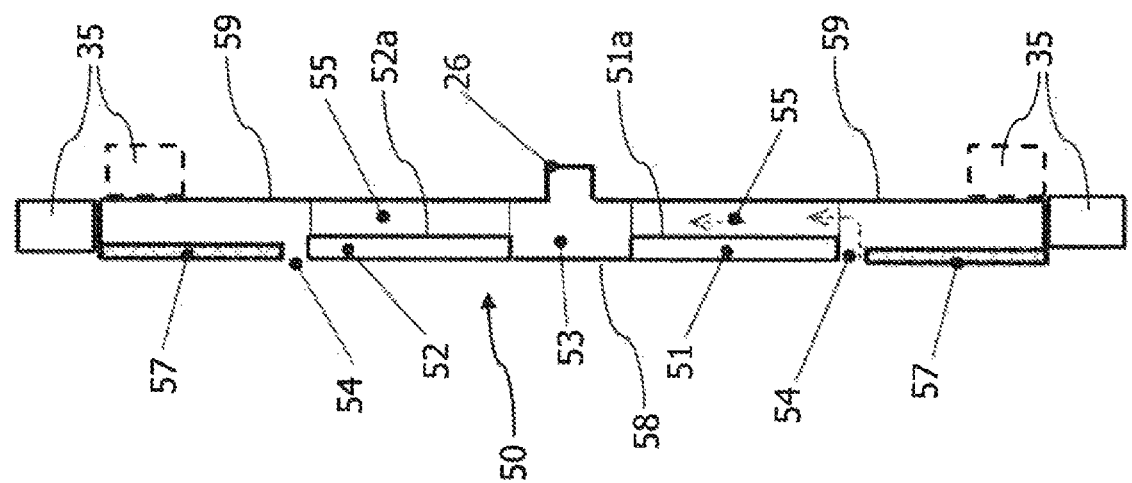
Figure 8:
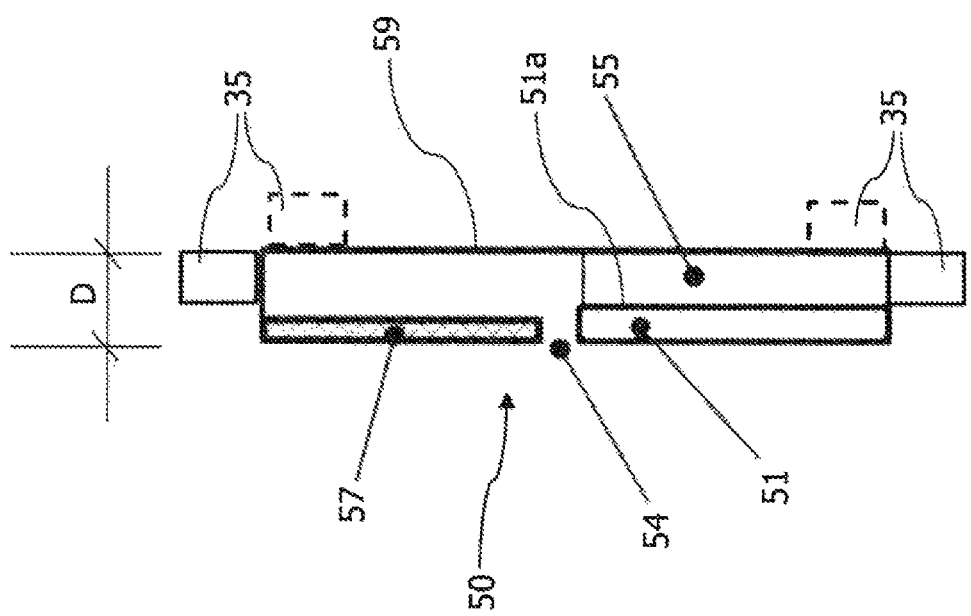

FIGS. 8 to 10 each show, schematically, a variant of a cross-section of a structural element 50. The structural element 50 shown in FIG. 8 has only one heat transfer fluid channel 51. Furthermore, a cooling air channel 53 is formed by a cover 57. FIG. 8 further shows that the structural element 50 can also have an optional rear wall 59. This serves on the one hand to form a one-part structural element 50, that is to say as a connecting element between the heat transfer fluid channel 51 and the cover 57. Furthermore, the rear wall 59 can also receive or form the structural element holding means 35.

The structural element 50 shown in FIG. 8 can be inserted into the recess 10 of a primary structural assembly 100 in the same way as a larger structural element 50 as is shown, for example, in FIG. 9. The remaining region of the recess 10 can either be occupied by a further structural element 50 according to FIG. 8 or can simply be closed by a cover 57. The primary structural assembly 100 can thus be equipped with structural elements 50 of any size and with heat transfer fluid channels 51, 52 of any size, according to requirements. With reference to FIG. 3, the structural element 50 can also have any desired extent in the longitudinal direction of the aircraft (X-axis). Likewise according to requirements, the heat transfer fluid channel 51, 52 can here be of any size.

The structural element 50 shown in FIG. 9 corresponds to the variant from FIG. 4. There is further shown in FIG. 9 an interface 26 for the cooling air channel 53. This can be in the form of a pipe or tube which corresponds to the cooling air connection 25, in order to establish a fluidic connection between the cooling air channel 53 and the cooling air channel 27 adjoining the recess 10. Alternatively, the interface 26 for the cooling air channel 53 can also simply be an opening which corresponds to an associated opening of the cooling air connection 25. In other words, the interface 26 can be implemented in the form of an opening in the rear wall 59.

FIG. 10 shows a structural element 50 which consists only of a heat transfer fluid channel 51. One or more structural element holding means 35 can optionally also be provided on the heat transfer fluid channel 51. A structural element 50 without a cooling air channel 53 can thus also be produced. This form of the structural element 50 is distinguished by its smaller thickness D. For example, the thickness D can be only from 2 to 5 mm, preferably from 2 to 3 mm Correspondingly, the depth T of the recess 10 is also extremely small, whereby only a slight change in the primary structure is necessary. The load-bearing capacity of the primary structure is therefore scarcely impaired. However, the heat transfer fluid channel 51 can be used effectively for cooling only in flight operation. In ground operation, effective cooling is possible at low outside temperatures and/or without incident solar radiation.

In FIGS. 8 and 9, the wall 51a, 52a delimiting the heat transfer fluid channel 51, 52 is also denoted, which walls delimit at least a portion of the cooling air channel 53. Cooling fins 55 which conduct the cooling air stream in the cooling air channel 53 can be fastened to or arranged on this wall 51a, 52a.

Figure 11:
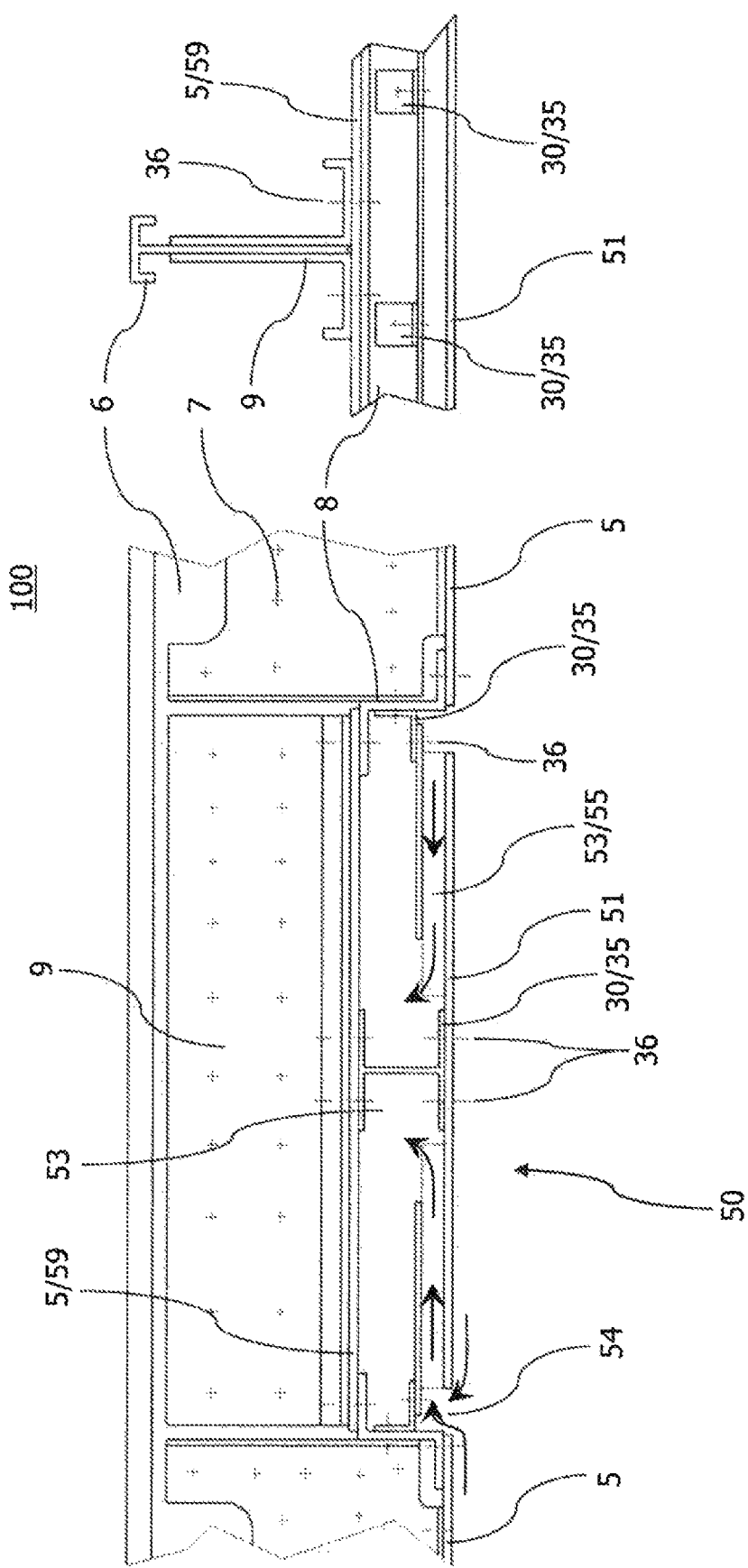
FIG. 11 shows, schematically, a longitudinal section and a cross-section of a primary structural assembly.

FIG. 11 shows, schematically, a longitudinal section and a cross-section of an embodiment variant of the primary structural assembly 100. The primary structural assembly 100 comprises, in addition to the outside skin portion 5, at least one former 6 and at least one stringer 8. The outside skin 5 is fastened to the stringers 8, wherein the stringers 8 run predominantly in the longitudinal direction of the aircraft 1. The former 6 runs in a cross-sectional plane of the aircraft 1. For simplicity, the components illustrated in FIG. 11 are depicted by straight lines. A former 6, for example, is usually curved and corresponds substantially to the cross-sectional shape of the fuselage of the aircraft 1.

Since the former 6 is arranged on the side of the stringers 8 facing the aircraft interior, gusset plates 7 are usually provided, which gusset plates comprise portions of which one lies laterally against the stringer 8 and another lies laterally against the former 6. As can be seen in FIG. 11, the recess 10, in order to form the cooling air channel 53, projects into the interior of the aircraft 1 in such a manner that at least one former 6, stringer 8 and/or gusset plate 7 must be changed (in particular, shortened) in the profile at least in some regions or must be omitted. However, the section modulus of the former 6, stringer 8 and/or gusset plate 7 (that is to say, of the primary structure) is thereby reduced. In order to compensate for this, an additional gusset plate 9 is provided. This can be fastened to a former 6, for example, and stabilize the outside skin 5 and/or rear wall 59 of the structural element 50 forming the recess 10.

With reference to FIGS. 8, 10 and 11, it can clearly be seen that a structural element 50 according to FIG. 10 with a very small thickness D avoids the above-mentioned reduction in the section modulus of the primary structure. If, however, cooling air channels 53 are to be provided, the installation space necessary for the recess 10 must be created. In a region of the aircraft 1 in which an aircraft cabin or hold is located, the inner side of the former 6 cannot be displaced further into the interior of the aircraft 1, since otherwise the space required there for the interior fittings of the aircraft 1 would be absent.

In other regions of the aircraft, for example an unpressurized region, such as, for example, the belly fairing, the dimensions of the former 6, stringer 8 and/or gusset plate 7 can be displaced further into the aircraft interior. The additional gusset plate 9 can thereby be avoided, whereby weight is saved. In this case, the outside skin 5 in the recess 10 or rear wall 59 of the structural element 50 can also be omitted. A cooling air conveying device 60 can thereby be provided in the aircraft interior (for example as close as possible to the structural element 50), which cooling air conveying device conveys ambient air through the cooling air channel 53 into the aircraft interior or, conversely, out of the aircraft interior through the cooling air channel 53 via the heat transfer fluid channel 51 into the surrounding area of the aircraft 1.

FIG. 11 further shows a possible variant of the holding means 30 and structural element holding means 35. For example, the holding means 30 can be implemented in the form of an angular element which is fastened to a stringer 8, for example, by means of a screw connection. The structural element holding means 35 can be in the form of a screw connection 36, for example. All the screws shown in FIG. 11 are illustrated by means of a double-dotted line. This holding means 30 can be arranged, for example, on a side wall of the recess 10 which is likewise formed by the stringer 8. A further holding means 30 or structural element holding means 35 can be provided in the middle of the recess 10, or in the middle of the structural element 50, and fastened to the additional gusset plate 9 and/or to the former 6. In FIG. 11, this is shown as a double-T beam.

FIG. 12 shows, schematically, a cross-section of an aircraft 1 having two primary structural assemblies 100 in the belly region of the aircraft 1. The two primary structural assemblies 100 can each be connected via a cooling air channel 27 to a cooling air conveying device 60. The arrows illustrated in FIG. 12 show a cooling air stream, which flows in the opposite direction to the cooling air stream shown in FIG. 3. For example, in ground operation, the cooling air conveying device 60 can draw in ambient air and supply it to at least one system within the aircraft 1 which likewise requires ambient air (e.g., an inert gas generator or cabin air conditioning system). The exhaust air discharged by this at least one system can in turn be conducted via the cooling air channels 27 to the respective primary structural assembly 100. Alternatively, the cooling air conveying device 60 can also conduct at least a portion of the conveyed ambient air directly into the cooling air channels 27.

In a further embodiment, the cooling air conveying device 60 can convey ambient air through the opening/s 54 of one primary structural assembly 100 into the aircraft interior and out of the aircraft 1 again through the opening/s of a further primary structural assembly 100. The cooling air channel 27 can thereby be made shorter. Alternatively, the cooling air conveying device 60 can also convey ambient air through (a) first opening/s 54 of a primary structural assembly 100 into the aircraft interior and out of the aircraft 1 again through (a) second opening/s of the same primary structural assembly 100. A cooling channel 27 can thereby be omitted.

FIG. 13 shows, schematically, a cross-section of an aircraft 1. In particular, it can be seen in FIG. 13 that primary structural assemblies 100, or the corresponding recesses 10 and structural elements 50, can be arranged at many arbitrary locations in the outside skin 5 of the aircraft 1. The arrangement of a primary structural assembly 100 is thus not limited to the belly region of the aircraft 1. Rather, a primary structural assembly 100 can also be arranged on the upper side of the aircraft 1 or at any desired location of a wing 2 of the aircraft 1.

Figure 14:
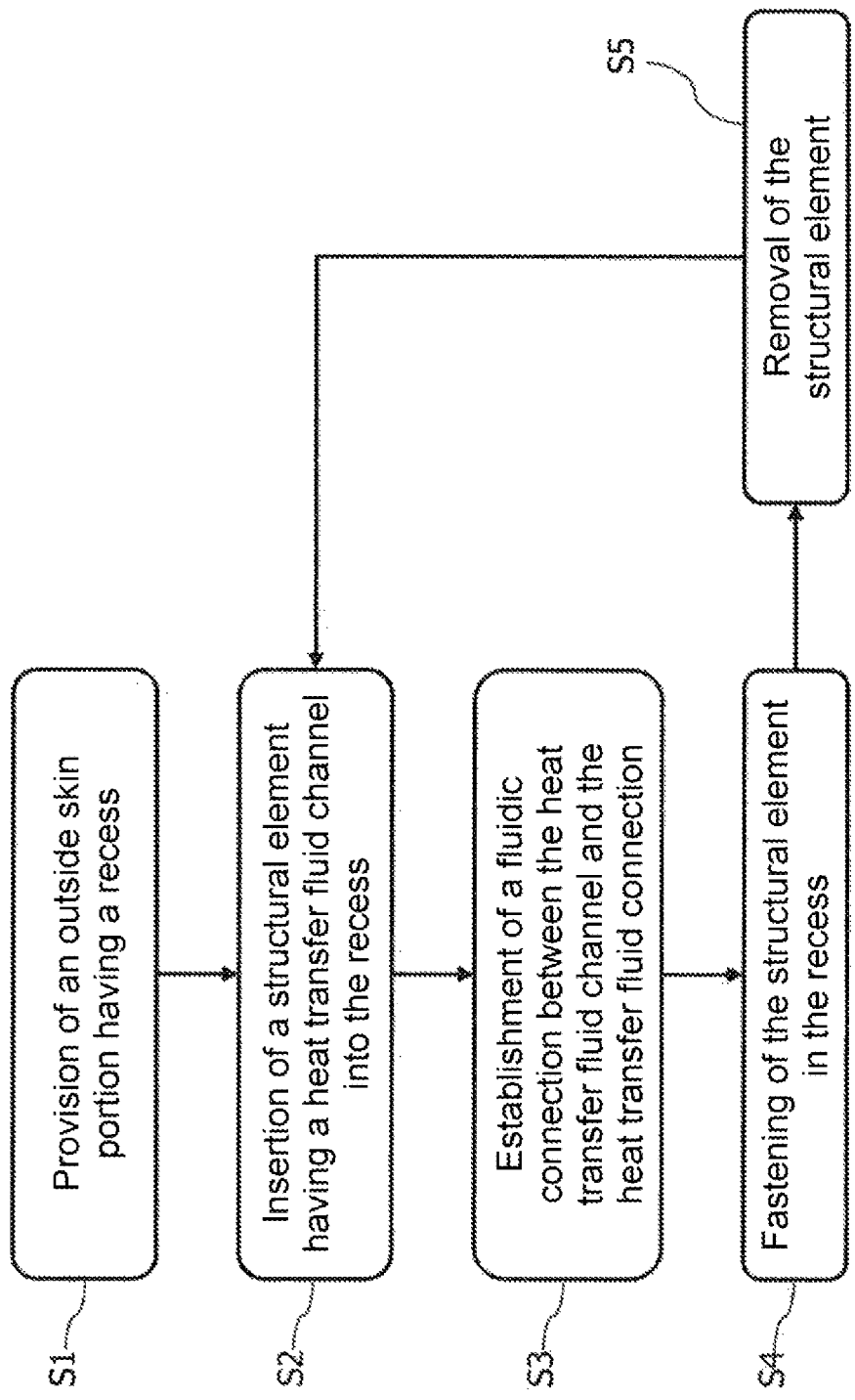
FIG. 14 shows a flow chart of a method for attaching an aircraft outside-skin heat exchanger.

Finally, FIG. 14 shows a flow chart of a possible method for attaching an aircraft outside-skin heat exchanger. To this end, in a first step S1, an outside skin portion 5 having at least one recess 10 is provided or produced, wherein the outside skin portion 5 defines an outer shape of an aircraft 1 and forms a portion of the shell of the aircraft 1.

In a further step S2, a structural element 50 closing the recess 10 can be inserted into the recess 10. The structural element 50 can comprise a heat transfer fluid channel 51, 52. By subsequently establishing (step S3) a fluidic connection between the heat transfer fluid channel 51, 52 and a heat transfer fluid connection 20 which is adapted to guide a heat transfer fluid into the recess 10, an aircraft outside-skin heat exchanger can thus be created. Heat transfer fluid in the heat transfer fluid channel 51, 52 can thereby release heat to the ambient air. Alternatively or in addition, the heat transfer fluid channel 51, 52 can also be thermally coupled with a cooling air channel 53 provided in the structural element 50, so that heat energy can also be released to cooling air inside the cooling air channel 53.

Finally, in a step S4, the structural element 50 is fastened in the recess 10 by means of at least one holding means 30 arranged therein. To this end, the structural element 50 can also have a corresponding structural element holding means 35, which is preferably connected by positive engagement and/or frictional engagement to the holding means 30 arranged in the recess 10.

A method for exchanging an aircraft outside-skin heat exchanger can also be carried out in a similar manner. To this end, the structural element 50 is detached from the recess 10 in step S5 (reversal of step S4), and steps S2 to S4 are repeated with a different structural element 50.

The assemblies, devices, variants and methods described here show the release of heat energy of the heat transfer fluid to cooling air. A reverse thermal coupling can of course also take place, wherein the heat transfer fluid absorbs heat energy.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A primary structural assembly for an outside-skin heat exchanger for an aircraft, comprising:
  an outside skin portion which defines an outer shape of the aircraft and forms a portion of a shell of the aircraft, wherein the outside skin portion has at least one recess;
  a heat transfer fluid connection which is adapted to guide a heat transfer fluid into the recess;
  a structural element closing the recess; and
  at least one holding means arranged in or at the recess, which holding means is configured to hold the structural element closing the recess, in the recess,
  at least one heat transfer fluid channel arranged in the structural element closing the recess, wherein the at least one heat transfer fluid channel is fluidically coupled with the heat transfer fluid connection, so that the heat transfer fluid flows through the heat transfer fluid connection and then through the at least one heat transfer fluid channel, wherein the structural element comprises a cover which is flush with an outside skin of the aircraft outside the recess, wherein the at least one heat transfer fluid channel comprises a first heat transfer fluid channel and a second heat transfer fluid channel, the first heat transfer fluid channel separated from the second heat transfer fluid channel by the cover, wherein the at least one heat transfer fluid channel is fixedly attached directly to a primary structural element of the aircraft, the primary structural element being at least one of a former, a stringer and a gusset plate, wherein the at least one heat transfer fluid channel forms an outer wall of the aircraft and at least one cooling channel passes between the at least one heat transfer fluid channel and the outside skin portion of the aircraft.

2. The primary structural assembly as claimed in claim 1, wherein the heat transfer fluid connection has a first portion, through which the heat transfer fluid is guided through an outside skin of the aircraft to the at least one heat transfer fluid channel, and a second portion, through which the heat transfer fluid, after flowing through the at least one heat transfer fluid channel, is guided through the outside skin of the aircraft into the interior of the aircraft.

3. The primary structural assembly as claimed in claim 1, further comprising:
at least one cooling air channel arranged in the structural element closing the recess,
wherein cooling air flowing through the cooling air channel is thermally coupled with the heat transfer fluid flowing through the heat transfer fluid channel.

4. The primary structural assembly as claimed in claim 3, wherein at least one wall delimiting the heat transfer fluid channel delimits at least a portion of the cooling air channel.

5. The primary structural assembly as claimed in claim 3, further comprising:
a cooling air connection which is configured to guide cooling air through an outside skin of the aircraft,
wherein the cooling air channel is fluidically coupled with the cooling air connection, so that the cooling air flowing in the cooling air channel flows through the cooling air connection.

6. The primary structural assembly as claimed in claim 1, wherein the recess comprises at least one side wall, and wherein the holding means is arranged at or in the side wall.

7. The primary structural assembly as claimed in claim 1, wherein the structural element closing the recess has at least one structural element holding means.

8. The primary structural assembly as claimed in claim 7, wherein the at least one structural element holding means is connected by positive engagement.

9. The primary structural assembly as claimed in claim 7, wherein the at least one structural element holding means is connected by frictional engagement to the holding means arranged in the recess.

10. The primary structural assembly as claimed in claim 7, further comprising:
the at least one heat transfer fluid channel is arranged in the structural element closing the recess,
wherein at least one of the structural element holding means or the holding means arranged in the recess is adapted to hold the structural element in the recess in such a manner that the at least one heat transfer fluid channel is connected in a fluid-tight manner to the heat transfer fluid connection.

11. The primary structural assembly as claimed in claim 1, wherein the recess has over its entire surface a substantially equal depth into the interior of the aircraft.

12. The primary structural assembly as claimed in claim 1, further comprising at least one cooling air channel arranged outside the recess and adjoining the recess.

13. The primary structural assembly as claimed in claim 1, further comprising a cooling air conveying device which is arranged on a side of the outside skin portion facing the interior of the aircraft.

14. An aircraft having at least one primary structural assembly as claimed in claim 1.

15. A method for attaching the aircraft outside-skin heat exchanger of claim 1, comprising:
providing an outside skin portion having at least one recess, wherein the outside skin portion defines an outer shape of an aircraft and forms a portion of a shell of the aircraft;
inserting a structural element closing the recess into the recess, wherein the structural element comprises a heat transfer fluid channel;
establishing a fluidic connection between the heat transfer fluid channel and a heat transfer fluid connection which is configured to guide a heat transfer fluid into the recess; and
fastening the structural element in the recess by means of a holding means arranged therein.

16. The primary structural assembly as claimed in claim 1, wherein an outer side of the structural element comprising the at least one heat transfer fluid channel and the cover forms a continuous flush surface with the outside skin portion of the aircraft.

* * * * *